United States Patent
Fukuyama et al.

(10) Patent No.: US 10,450,426 B2
(45) Date of Patent: Oct. 22, 2019

(54) SAPONIFIED ETHYLENE-VINYL ESTER COPOLYMER PELLET AND METHOD FOR PRODUCING SAPONIFIED ETHYLENE-VINYL ESTER COPOLYMER PELLET

(71) Applicant: THE NIPPON SYNTHETIC CHEMICAL INDUSTRY CO., LTD., Osaka (JP)

(72) Inventors: Shuuichi Fukuyama, Osaka (JP); Atsushi Ono, Osaka (JP); Kouji Yamada, Osaka (JP); Shinichi Tanaka, Osaka (JP); Yoshiharu Nagao, Osaka (JP); Shinta Miyazumi, Osaka (JP); Seiichi Honda, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 15/104,409

(22) PCT Filed: Dec. 22, 2014

(86) PCT No.: PCT/JP2014/083992
§ 371 (c)(1),
(2) Date: Jun. 14, 2016

(87) PCT Pub. No.: WO2015/098884
PCT Pub. Date: Jul. 2, 2015

(65) Prior Publication Data
US 2016/0311984 A1  Oct. 27, 2016

(30) Foreign Application Priority Data

Dec. 24, 2013 (JP) .................................. 2013-265196
Dec. 17, 2014 (JP) .................................. 2014-255253

(51) Int. Cl.

| | |
|---|---|
| C08J 3/14 | (2006.01) |
| C08J 3/16 | (2006.01) |
| B29B 9/06 | (2006.01) |
| C08F 8/12 | (2006.01) |
| C08F 16/06 | (2006.01) |
| B29C 48/06 | (2019.01) |
| B29K 31/00 | (2006.01) |
| B29L 31/00 | (2006.01) |

(52) U.S. Cl.
CPC ................. *C08J 3/16* (2013.01); *B29C 48/06* (2019.02); *C08F 8/12* (2013.01); *C08F 16/06* (2013.01); *C08J 3/14* (2013.01); *B29B 9/06* (2013.01); *B29B 9/065* (2013.01); *B29K 2031/00* (2013.01); *B29L 2031/00* (2013.01); *C08J 2323/08* (2013.01); *C08J 2329/04* (2013.01)

(58) Field of Classification Search
CPC ........... B29B 9/06; B29B 9/065; C08F 16/06; B29K 2031/00; C08J 2329/04
See application file for complete search history.

(56) References Cited

U.S. PATENT DOCUMENTS

| | | | |
|---|---|---|---|
| 6,238,606 B1 | 5/2001 | Kunieda et al. | |
| 6,610,233 B1 | 8/2003 | Ninomiya et al. | |
| 2007/0075453 A1* | 4/2007 | Ayats | B29B 9/10 264/140 |
| 2014/0018462 A1* | 1/2014 | Tsuboi | C08J 3/28 522/113 |
| 2015/0152256 A1* | 6/2015 | Nakazawa | C08L 29/04 428/35.7 |
| 2016/0108193 A1* | 4/2016 | Kawai | C08J 5/18 428/216 |

FOREIGN PATENT DOCUMENTS

| | | |
|---|---|---|
| EP | 2862897 A1 | 4/2015 |
| JP | S64-066262 A | 3/1989 |
| JP | H09-067411 A | 3/1997 |
| JP | 2000-063528 A | 2/2000 |
| JP | 2000-128998 A | 5/2000 |
| TW | I356069 A | 1/2012 |
| WO | 2013/187455 A1 | 12/2013 |

OTHER PUBLICATIONS

Asano, electronic tranlation of TW I356069, Jan. 2012.*
European Search Report issued with respect to Application No. 14875821.2 dated Aug. 4, 2017.
International Search Report issued with respect to Application No. PCT/JP2014/083992, dated Mar. 31, 2015.
International Preliminary Report on Patentability issued with respect to Application No. PCT/JP2014/083992, dated Jun. 28, 2016.

* cited by examiner

*Primary Examiner* — Jeffrey C Mullis

(74) *Attorney, Agent, or Firm* — Greenblum & Bernstein, P.L.C.

(57) ABSTRACT

The invention provides a saponified ethylene-vinyl ester copolymer pellet which can be inhibited from cracking, chipping and generation of fine powder at the time of transport and is excellent in melt moldability. The saponified ethylene-vinyl ester copolymer pellet of the invention is a pellet which is obtained from a resin composition containing a saponified ethylene-vinyl ester copolymer resin and in which an amount of fine powder after an impact crushing test with ball mill is 400 ppm or less with respect to the saponified ethylene-vinyl ester copolymer pellet.

12 Claims, No Drawings

SAPONIFIED ETHYLENE-VINYL ESTER COPOLYMER PELLET AND METHOD FOR PRODUCING SAPONIFIED ETHYLENE-VINYL ESTER COPOLYMER PELLET

TECHNICAL FIELD

The present invention relates to a saponified ethylene-vinyl ester copolymer pellet, and more particularly, to a saponified ethylene-vinyl ester copolymer pellet which is inhibited from cracking, chipping and generation of fine powder at the time of transport and is excellent in melt moldability, and a method for producing the saponified ethylene-vinyl ester copolymer pellet.

BACKGROUND ART

Hitherto, a saponified ethylene-vinyl ester copolymer resin (hereinafter, sometimes referred to as EVOH resin) has a very strong intermolecular force due to a hydrogen bond between hydroxy groups present in the polymer side chain. Therefore, since the crystallinity is high and further the intermolecular force is high even in the amorphous portion, gas molecules and the like are hard to pass through the EVOH resin and a film using the EVOH resin exhibits an excellent gas barrier property.

By utilizing the excellent gas barrier property, the EVOH resin is used by being molded into a film or sheet for a food packaging material, a pharmaceutical packaging material, an industrial chemical packaging material, an agricultural chemical packaging material or the like, or a container, for example, a bottle.

The EVOH resin is generally distributed in a pellet state and at the time of transport of the EVOH resin pellet, it is usually packaged, for example, in kraft paper moisture-proofed with an aluminum inner bag or the like.

For example, as a method for producing EVOH resin pellet according to a strand cutting method, a method of cutting a strand-like material (continuous rod-like body) obtained by extruding the resin solution from dies into a coagulating liquid to allow for deposition or cutting a strand-like material obtained by extruding the resin molten by heating to allow cooling and solidifying, by using a strand cutter into pellets of certain size is proposed (see, for example, Patent Document 1).

PRIOR ART DOCUMENT

Patent Document

Patent Document 1: JP-A-64-66262

DISCLOSURE OF INVENTION

Problems to be Solved by the Invention

However, the EVOH resin pellet is porous because it is produced by extruding the EVOH resin solution into a coagulating liquid and cutting, and also has properties of being hard and brittle because of the high crystallinity of the EVOH resin.

Therefore, it has been found that a problem arises in that due to temperature change, state of loading, vibration or the like at the time of transport, the pellet may cause fusion, cracking, chipping or generation of fine powder and as a result, stable melt molding becomes difficult.

Thus, an EVOH resin pellet which is inhibited from cracking, chipping and generation of fine powder at the time of transport and is excellent in melt mold ability has been desired.

Means for Solving the Problems

As a result of the intensive investigations in view of the circumstances described above, the inventors have found that an amount of fine powder of EVOH resin pellet after a ball mill crushing test is relevant to the problem to be solved described above to complete the invention.

That is, it has been found that an EVOH resin pellet which satisfies the condition in which the amount of fine powder after the ball mill crushing test is 400 ppm or less with respect to the EVOH resin pellet can achieve the object described above.

That is, the invention is achieved by (1) to (4) described below.

A saponified ethylene-vinyl ester copolymer pellet which is obtainable from a resin composition containing a saponified ethylene-vinyl ester copolymer resin and in which an amount of fine powder after an impact crushing test with ball mill is 400 ppm or less with respect to the saponified ethylene-vinyl ester copolymer pellet.

[2] The saponified ethylene-vinyl ester copolymer pellet according to [1], which is obtainable by extruding a solution of a saponified ethylene-vinyl ester copolymer resin into a coagulating liquid of 2.0° C. or less and then cutting to be pelletized.

[3] A method for producing a saponified ethylene-vinyl ester copolymer pellet which comprises extruding a solution of a saponified ethylene-vinyl ester copolymer resin into a coagulating liquid and then cutting to be pelletized, wherein temperature of the coagulating liquid is 2.0° C. or less.

[4] The method for producing a saponified ethylene-vinyl ester copolymer pellet according to [3], wherein a solution in which the saponified ethylene-vinyl ester copolymer resin is dissolved in a mixed solution having a mixing weight ratio of water/solvent from 80/20 to 5/95 is extruded into the coagulating liquid.

Effects of the Invention

The EVOH resin pellet of the invention has an advantage in that it can be inhibited from cracking, chipping and generation of fine powder at the time of transport so that it is excellent in the melt moldability, because an amount of fine powder after the specific ball mill crushing test is specifically small.

MODE FOR CARRYING OUT THE INVENTION

Hereinafter, the constitutions of the invention are described in detail, but they are intended to show an example of desirable embodiments, and the invention should not be specified to these contents.

The saponified ethylene-vinyl ester copolymer pellet of the invention is obtained from a resin composition containing a saponified ethylene-vinyl ester copolymer resin (EVOH resin).

[EVOH Resin]

The EVOH resin used in the invention is usually a resin obtained by copolymerizing ethylene and a vinyl ester monomer and then saponifying, and is a water-insoluble thermoplastic resin. As the vinyl ester monomer described above, vinyl acetate is generally used from economic aspect.

As to the polymerization method, any known polymerization method, for example, solution polymerization, suspension polymerization or emulsion polymerization can be used, and in general, solution polymerization using methanol as a solvent is used. The saponification of the resulting ethylene-vinyl ester copolymer may also be performed in a known manner.

That is, the EVOH resin contains an ethylene structural unit and a vinyl alcohol structural unit as the main structural units and some amount of a vinyl ester structural unit remaining without being saponified.

As to the EVOH resin which is a raw material of the EVOH resin pellet of the invention, usually, the ethylene content is preferably from 20 to 60% by mole, more preferably from 20 to 40% by mole, and particularly preferably from 20 to 35% by mole. Also, the saponification degree of the EVOH resin is preferably 90% by mole or more, more preferably 94% by mole or more, particularly preferably 96% by mole or more, and most preferably 98% by mole or more. When the ethylene content is too low, the gas barrier property at high humidity and melt moldability are decreased, and to the contrary, when it is too high, the sufficient gas bather property cannot be obtained, moreover, when the saponification degree is too low, the gas barrier property, heat stability, moisture resistance and the like are unpreferably decreased.

Also, the melt index (MI) (210° C., load 2160 g) of the EVOH resin is, usually, preferably from 0.1 to 100 g/10 min, more preferably from 1 to 50 g/10 min, particularly preferably from 1.5 to 30 g/10 min, and most preferably from 2 to 30 g/10 min. When the melt index is lower than the range, the inside of the extruder becomes a high torque state during molding to make the extrusion processing difficult. When it is higher than the range, the mechanical strength of the molded product becomes unpreferably insufficient.

The ethylene content of the EVOH resin can be measured, for example, in accordance with ISO 14663-1 (1999), and the saponification degree of the EVOH resin can be measured, for example, in accordance with HS K6726 (1994) (however, the EVOH resin is measured as a solution uniformly dissolved in water/methanol solvent).

The EVOH resin which can be used in the invention may further contain a structural unit derived from a comonomer shown below within a range not inhibiting from the effect of the invention (for example, 10% by mole or less). The comonomer includes an α-olefin, for example, propylene, isobutene, α-octene, α-dodecene or α-octadecene, a hydroxy group-containing α-olefin, for example, 3-buten-1-ol, 4-penten-1-ol or 3-buten-1,2-diol, a hydroxy group-containing α-olefin derivative, for example, an esterified product thereof or an acylated product thereof, an unsaturated carboxylic acid or a salt, a partial alkyl ester, a complete alkyl ester, a nitrile, an amide or an anhydride thereof, an unsaturated sulfonic acid or a salt thereof, a vinyl silane compound, vinyl chloride, styrene and the like.

Moreover, an EVOH-based resin subjected to "post-modification", for example, urethanation, acetalization, cyanoethylation or oxyalkylenation may also be used.

Of the modified products as described above, an EVOH resin in which a primary hydroxy group is introduced into its side chain by copolymerization is preferred from the standpoint of excellent secondary moldability, for example, stretching treatment and vacuum/pressure moldability, and among them, an EVOH resin having an 1,2-diol structure in its side chain is preferred.

The EVOH resin pellet of the invention includes the EVOH resin as described above, and in the invention it is necessary that an amount of fine powder of the EVOH resin pellet after the ball mill crushing test is 400 ppm or less with respect to the EVOH resin pellet. When such a requirement is not satisfied, it is difficult to achieve the object of the invention. When the amount of fine powder of the EVOH resin pellet after the ball mill crushing test is 400 ppm or less with respect to the EVOH resin pellet, surface roughness of the pellet is small and the pellet has the state excellent in smoothness, so that the pellet can be inhibited from cracking, chipping and generation of fine powder at the time of transport.

That is, the amount of fine powder of the EVOH resin pellet after the ball mill crushing test is 400 ppm or less, preferably 300 ppm or less, more preferably 200 ppm or less, particularly preferably 100 ppm or less, especially preferably 50 ppm or less, with respect to the EVOH resin pellet. When the amount of fine powder of the EVOH resin pellet after the ball mill crushing test is too large, there is a tendency that a large amount of cracking, chipping and fine powder occurs at the time of transport and the melt moldability is not excellent.

Although the lower limit of the proportion of the fine particle is not particularly limited, considering slipperiness of the pellets with each other during molding or the like, it is preferably 5 ppm, and more preferably 10 ppm with respect to the EVOH resin pellet.

The amount of fine powder of the EVOH resin pellet after the ball mill crushing test in the invention means an amount of fine powder (crushing amount) generated by crushing when the EVOH resin pellet is subjected to the ball mill crushing test.

Specifically, the EVOH resin pellet (230 g) and alumina balls (15 mmφ, 95 pieces) are charged in an alumina pot (capacity: 1,000 cc, outer diameter: 140 mmφ), treated at 20° C. and a rotation number of 75 rpm for 30 minutes, and an amount crushed is defined as the amount of fine powder of the EVOH resin pellet after the ball mill crushing test.

Usually, the EVOH resin pellet is obtained by forming pellet form from an EVOH resin solution by a strand cutting method, an underwater cutting method or the like, performing water washing, and, if desired, after contacting with an aqueous solution of additive, performing drying treatment.

To satisfy the amount of fine powder after the ball mill crushing test is not particularly limited, and is possible by appropriately combining, for example,
(1) composition of the EVOH resin solution,
(2) temperature at the time of extrusion of the EVOH resin solution into a coagulating liquid,
(3) kind of the coagulating liquid,
(4) temperature of the coagulating liquid,
(5) retention time of the EVOH resin in the coagulating liquid, and
(6) size of the EVOH resin pellet after cutting in the process of pelletization described above, and
(7) temperature of the aqueous solution of additive in the process of contacting with the aqueous solution of additive described above.

In particular, among (1) to (7) described above, by setting the temperature of the coagulating liquid (4) in the process of pelletization to a specific temperature, it is possible to suitably obtain the desired EVOH resin pellet.

A method for obtaining the EVOH resin pellet of the invention is described in detail.

At the time of preparing a solution of the EVOH resin, it is sufficient to dissolve the EVOH resin in a dissolvable solvent, and the solvent, method and the like are not limited. As the solvent, a solvent, for example, methanol, ethanol, propanol, phenol, dimethylsulfoxide (DMSO), dimethylformamide (DMF) or hexafluoroisopropanol (HFIP) and an aqueous solution (mixed solution) containing the solvent are exemplified.

The concentration of the EVOH resin contained in the EVOH resin solution is preferably from 10 to 60% by weight, and more preferably from 15 to 50% by weight. When the concentration is too low, it is difficult to be coagulated in the coagulating liquid, and to the contrary, too high concentration is not preferred, because the porosity rate of the resulting pellet is decreased and the heat stability during molding is adversely affected.

Also, as the method for preparing the solution, i) method of dissolving powder, pellet or the like of the EVOH resin in the solvent or the mixed solution of water/solvent so as to be a predetermined concentration, ii) method of adding an appropriate amount of the solvent, water or the mixed solution thereof to a solvent solution of EVOH resin after saponification treatment in the production of EVOH resin, and iii) method of dissolving pellet of hydrous EVOH resin after deposition or deposition-water washing in the production of EVOH resin in the solvent or the mixed solution of water/solvent so as to be a predetermined concentration and a liquid composition can be exemplified. In view of production, the method of ii) is suitably adopted.

In the case where the EVOH resin solution is an aqueous solution, as to the composition of the EVOH resin solution (1), a mixing weight ratio of water/solvent is preferably from 80/20 to 5/95, more preferably from 75/25 to 20/80, particularly preferably from 70/30 to 30/70, and especially preferably from 65/35 to 37/63. In the mixing weight ratio of water/solvent, when the content of water is too low, the solution of saponified product becomes somewhat unstable to tend to increase the porosity rate of the strand, and to the contrary, when it is too high, the solution of saponified product becomes unstable to tend to generate precipitate in the solution of saponified product.

As to the temperature at the time of extrusion of the EVOH resin solution into a coagulating liquid (2), a temperature lower than the boiling point of the mixed solution of water/solvent is preferred. Specifically, the temperature is preferably from 45 to 70° C., more preferably from 50 to 69° C., and particularly preferably from 55 to 68° C. When the temperature at the time of extrusion of the EVOH resin solution is lower than 45° C., the EVOH resin solution tends to deposit and solidify in the extruder, and to the contrary, when it is too high, the coagulability tends to decrease.

The EVOH resin solution may be as it is, may be appropriately concentrated or diluted, or it is also possible to adjust by adding water. At this point, a lubricant, for example, a saturated aliphatic amide (for example, stearic acid amide), an unsaturated fatty acid amide (for example, oleic acid amide), a bisfatty acid amide (for example, ethylene bisstearic acid amide), a fatty acid metal salt (for example, calcium stearate), or a low molecular weight polyolefin (for example, a low molecular weight polyethylene or low molecular weight polypropylene having a molecular weight approximately from 500 to 10,000), an inorganic salt (for example, hydrotalcite), a plasticizer (for example, an aliphatic polyhydric alcohol, for example, ethylene glycol, glycerol or hexanediol), an antioxidant, an ultraviolet absorbing agent, a coloring agent, an antibacterial agent, an antiblocking agent, a slipping agent and the like may be blended.

As to the kind of the coagulating liquid (3), water or a water/alcohol mixed solution, an aromatic hydrocarbon, for example, benzene, a ketone, for example, acetone or methyl ethyl ketone, an ether, for example, dipropyl ether, an organic acid ester, for example, methyl acetate, ethyl acetate or methyl propionate and the like are used, and these may be used one kind singly or may be used in combination of two or more kinds. The higher concentration of water in the coagulating liquid is easier to reduce the amount of fine powder of the pellet. Among them, in view of ease of handling, water or a water/alcohol mixed solution (usually, a weight ratio of water/alcohol is from 90/10 to 99/1) is preferred. As the alcohol, an alcohol, for example, methanol, ethanol or propanol is used, and methanol is industrially preferably used.

As to the temperature of the coagulating liquid (4) at the time of contacting the EVOH resin solution to the coagulating liquid, a temperature at which the EVOH resin solution is easy to coagulate may be used. Specifically, it is preferred that the temperature of the coagulating liquid is set to a low temperature of 2.0° C. or less. The temperature of the coagulating liquid is more preferably from −10.0 to 2.0° C., still more preferably from −5.0 to 2.0° C., and particularly preferably from 0 to 2.0° C. By setting the water temperature of the coagulating liquid to the specific temperature described above, it becomes possible to obtain the desired EVOH resin pellet, and in particular, it is effective in the case of the EVOH resin pellet of low ethylene content. Since the coagulating solvent described above is a non-solvent for the saponified product, it is hardly fear of causing the resin loss by dissolving the saponified product in the coagulating liquid, but the operation at a temperature as low as possible is safe.

In the invention, by setting the temperature of the coagulating liquid to 2.0° C. or less, the surface portion of the EVOH resin pellet becomes high density to enable to set the amount of fine powder of the EVOH resin pellet after the ball mill crushing test to 400 ppm or less so that it is possible to suitably obtain the desired EVOH resin pellet.

As to the retention time of the EVOH resin in the coagulating liquid (5), the retention time may vary depending on the resin concentration, ethylene content, saponification degree and mixing weight ratio of solvent/water, and it is sufficient to retain until the EVOH resin is coagulated. Specifically, the retention time is preferably from 10 to 400 seconds, more preferably from 30 to 200 seconds, and particularly preferably from 50 to 100 seconds. When the retention time is too short, the coagulability tends to decrease, and to the contrary, when it is too long, the productivity tends to decrease.

Subsequently, the EVOH resin solution is coagulated, cut and then washed with water. The cutting method may be appropriately selected from a strand cutting method, an underwater cutting method (for example, an underwater cut method) and the like.

The strand cutting method is a method of cutting a strand-like material (continuous rod-like body) obtained by extruding the EVOH resin solution from dies into a coagulating liquid to allow for deposition or a strand-like material obtained by extruding the resin molten by heating to allow cooling and solidifying by using a strand cutter into a pellet of certain size, thereby producing the EVOH resin pellet of cylindrical form.

The underwater cutting method (for example, an underwater cut method) is a method of extruding the EVOH resin solution in a hydrous and molten state in an extruder from a discharge port into a coagulating liquid and cutting in the molten state by using a cutter into a pellet of certain size, thereby producing the EVOH resin pellet of spherical form.

As to the size of the EVOH resin pellet after cutting (6), from the standpoint of workability during molding and handling, in the case of the pellet of cylindrical form obtained by the strand cutting method, that having a diameter of the bottom surface of from 1 to 6 mm and a length of from 1 to 6 mm (even more from 2 to 5 mm, respectively), or in the case of the pellet of spherical form (rugby ball like form) obtained by the water cutting method, that having a diameter of from 1 to 6 mm (even more from 2 to 5 mm) is practical.

The water washing of the EVOH resin is performed in a water tank of 10 to 60° C. By the water washing, the contents of an alcohol having a carbon number of 5 or less, acetic acid and sodium acetate in the EVOH resin are adjusted and also an oligomer and impurities are removed.

The water washing method is performed with from 200 to 1,000 parts by weight of water, preferably from 200 to 600 parts by weight of water, with respect to 100 parts by weight of the EVOH resin pellet, at from 20 to 50° C., preferably from 25 to 35° C., for from 0.5 to 5 hours, preferably from 1 to 4 hours, and from once to 5 times, preferably once.

By the water washing described above and operation of contacting with an aqueous solution of additive, it is preferred that usually the content of the alcohol having a carbon number of 5 or less is adjusted from 0.0001 to 1 part by weight, the content of acetic acid is adjusted from 0.01 to 1 part by weight, and the content of sodium acetate is adjusted from 0.01 to 1 part by weight, with respect to 100 parts by weight of the EVOH resin pellet.

Then, if desired, the EVOH resin pellet is contacted with an aqueous solution of additive.

As the additive, a heat stabilizer, for example, an organic acid, for example, acetic acid, propionic acid, butyric acid, lauric acid, stearic acid, oleic acid or behenic acid, or a salt thereof, for example, an alkali metal salt (for example, sodium or potassium), an alkaline earth metal salt (for example, calcium or magnesium) or zinc salt; or an inorganic acid, for example, sulfuric acid, sulfurous acid, carbonic acid, phosphoric acid or boric acid, or a salt thereof, for example, an alkali metal salt (for example, sodium or potassium), an alkaline earth metal salt (for example, calcium or magnesium) or zinc salt is exemplified.

Among them, it is particularly preferred to add acetic acid, a boron compound including boric acid and a salt thereof, an acetate or a phosphate.

By contacting the EVOH resin with the aqueous solution of additive, the additive is introduced into the EVOH resin pellet described above so that it is possible to improve various physical properties, for example, heat stability during melt molding.

As to the method for contacting the EVOH resin with the aqueous solution of additive, from 200 to 1,000 parts by weight, preferably from 200 to 600 parts by weight, of an aqueous solution containing 3% by weight or less, preferably from 0.3 to 1.5% by weight, of the additive is used with respect to 100 parts by weight of the EVOH resin pellet. The temperature of the aqueous solution of additive (7) at the time of contacting is preferably from 10 to 80° C., more preferably from 20 to 60° C., and particularly preferably from 25 to 40° C. The contact time is preferably from 0.5 to 5 hours, and more preferably from 1 to 4 hours, and the contact is performed from once to 3 times, preferably once.

In the invention, the treatment can be performed by appropriately combining two or more kinds and numerical ranges of the composition of the EVOH resin solution (1), the temperature at the time of extrusion of the EVOH resin solution into a coagulating liquid (2), the kind of the coagulating liquid (3), the temperature of the coagulating liquid (4), the retention time of the EVOH resin in the coagulating liquid (5), the size of the EVOH resin pellet after cutting (6), and the temperature of the aqueous solution of additive (7), depending on the kind of the starting EVOH resin used.

By the operation of contacting with the aqueous solution of additive described above, usually, it is preferred to adjust acetic acid from 0.001 to 1 part by weight, a boron compound from 0.001 to 1 part by weight in terms of boron (analysis by ICP emission spectrometry after incineration), an acetate and a phosphate (including a hydrogen phosphate) from 0.0005 to 0.1 part by weight in terms of metal (analysis by ICP emission spectrometry after incineration), respectively, with respect to 100 parts by weight of the EVOH resin pellet.

Then, the EVOH resin pellet is dried. As to the drying method, although it is possible to adopt various drying methods, in the invention it is preferred to perform fluidized drying, and further, a drying method of performing static drying before or after the fluidized drying, that is, a method of performing the static drying treatment after the fluidized drying treatment or a method of performing the fluidized drying treatment after the static drying treatment is particularly preferred.

The fluidized drying as used herein means drying which is performed with substantially stirring and dispersing the EVOH resin pellet mechanically or by hot air. As a dryer for performing the drying, a cylindrical agitated trough dryer, a cylindrical dryer, a rotary dryer, a fluidized-bed dryer, a vibrating fluidized-bed dryer, a conical rotary dryer and the like are exemplified. Also, the static drying as used herein means drying which is performed without substantially providing a dynamic action, for example, stirring or dispersing to the EVOH resin pellet. As a dryer for performing the drying, a batch-wise box type dryer as a material standing type, and a band dryer, a tunnel dryer, a vertical silo dryer and the like as a material transfer type are exemplified. However, the dryer is not limited thereto.

For instance, a method of performing the static drying treatment after the fluidized drying treatment is described below.

As a heating gas used at the time of the fluidized drying treatment, air or an inert gas (for example, nitrogen gas, helium gas or argon gas) is used. The temperature of the heating gas is preferably 95° C. or less, and more preferably from 40 to 90° C. The temperature exceeding 95° C. is not preferred, because fusion of the EVOH resin pellets occurs.

Further, the velocity of the heating gas in the dryer is set preferably from 0.7 to 10 m/sec, more preferably from 0.7 to 5.0 m/sec, and particularly preferably from 1.0 to 3.0 m/sec. The velocity of less than 0.7 m/sec is not preferred because fusion of the EVOH resin pellets is apt to occur, and to the contrary, the velocity exceeding 10 m/sec is not preferred because chipping or the like of the EVOH resin pellet is apt to occur. Also, as to the time for the fluidized drying, although it depends on the treatment amount of the EVOH resin pellet, usually, it is preferably from 5 minutes to 36 hours, and more preferably from 10 minutes to 24 hours.

The EVOH resin pellet is subjected to the fluidized drying treatment under the conditions described above, and the water content of the EVOH resin pellet after the fluidized drying treatment is preferably from 5.0 to 60% by weight, and more preferably from 10 to 55% by weight. The water content of less than 5.0% by weight is not preferred because discharge fluctuation is apt to occur in the case of melt molding of the EVOH resin pellet obtained after the static drying treatment, and to the contrary, the water content exceeding 60% by weight is not preferred because fusion of the EVOH resin pellets is apt to occur at the time of the following static drying treatment and fine fish-eyes (fine particles of the resin) tend to frequently occur in the case of melt molding of the EVOH resin pellet obtained. Further, in the fluidized drying treatment, the water content is decreased preferably 5.0% by weight or more, more preferably from 10 to 45% by weight, in comparison with the water content before the fluidized drying treatment. The case in which the decrease in the water content is less than 5.0% by weight is also not preferred because the fine fish-eyes tend to frequently occur in the case of melt molding of the EVOH resin pellet obtained.

The EVOH resin pellet subjected to the fluidized drying treatment as described above is then subjected to the static drying treatment. As a heating gas used for the static drying treatment, an inert gas (for example, nitrogen gas, helium gas or argon gas) is similarly used. The temperature of the heating gas is preferably 75° C. or more, and more preferably from 85 to 150° C. The temperature of less than 75° C. is not preferred because it requires an extremely long drying time and is economically disadvantageous.

Further, the velocity of the gas in the dryer is set preferably less than 1.0 m/sec, and more preferably from 0.01 to 0.5 m/sec. The velocity exceeding 1 m/sec is not preferred because it is difficult to maintain the EVOH resin pellet in the static state.

Also, as to the time for the static drying treatment, although depending on the treatment amount of the EVOH resin pellet it cannot be said generally, usually, it is preferably from 10 minutes to 72 hours, and more preferably from 1.0 to 48 hours. The EVOH resin pellet is subjected to the static drying treatment under the conditions described above to obtain the EVOH resin pellet finally dried, and the water content of the EVOH resin pellet after the treatment (final) is preferably from 0.001 to 2.0% by weight, and more preferably from 0.01 to 1.0% by weight. The water content of less than 0.001% by weight is not preferred because the long-run moldability of the EVOH resin pellet is apt to be degraded, and to the contrary, the water content exceeding 2.0% by weight is not preferred because foaming occurs in the molded article.

The EVOH resin pellet used in the invention may be a composition in which the base resin is the EVOH resin.

Therefore, the content of the EVOH resin in the total resin composition is usually from 50 to 99% by weight, preferably from 60 to 95% by weight, and particularly preferably from 70 to 90% by weight. When the content of the EVOH resin is in the range described above, the effect of the invention is sufficiently obtained.

The EVOH resin pellet of the invention may contain, in addition to the EVOH resin, other thermoplastic resin usually in an amount of 30% by weight or less with respect to the EVOH resin.

As the other thermoplastic resin, specifically, a thermoplastic resin, for example, a homo- or copolymer of olefin, for example, straight chain low density polyethylene, low density polyethylene, medium density polyethylene, high density polyethylene, an ethylene-vinyl acetate copolymer, an ionomer, an ethylene-propylene copolymer, an ethylene-α-olefin (α-olefin having from 4 to 20 carbon atoms) copolymer, an ethylene-acrylic acid ester copolymer, polypropylene, a propylene-α-olefin (α-olefin having from 4 to 20 carbon atoms) copolymer, polybutene or polypentene, a polyolefin-based resin in a broad sense, for example, a modified product obtained by graft-modification of polycyclic olefin or the homo- or copolymer of olefin with an unsaturated carboxylic acid or an ester thereof, a polystyrene resin, polyester, polyamide, copolymerized polyamide, polyvinyl chloride, polyvinylidene chloride, an acrylic resin, a vinyl ester resin, a polyester elastomer, a polyurethane elastomer, chlorinated polyethylene or chlorinated polypropylene is exemplified.

For the thermoplastic rein, although a raw material derived from petroleum, for example, naphtha is usually used, a raw material derived from natural gas, for example, shale gas or a raw material derived from a plant obtained by purifying from a component of sugar, starch or the like contained in sugar cane, sugar beet, maize, potato or the like or a component of cellulose or the like contained in rice, wheat, millet, grass plant or the like may also be used.

In particular, in the case where the resin composition of the invention is used in the form of a multilayer structure as a packaging material for food, it is preferred to blend a polyamide resin in view of preventing elution of the EVOH resin layer at the edge of the packaging material after the hot-water treatment for the packaging material.

Also, in the EVOH resin pellet of the invention, in addition to the components described above, if desired, a known additive may be appropriately blended as long as it does not inhibit the effect of the invention (for example, less than 5% by weight of the total resin composition). The known additive includes, for example, a plasticizer, for example, an aliphatic polyhydric alcohol, for example, ethylene glycol, glycerol or hexanediol; a lubricant, for example, a saturated aliphatic amide (for example, stearic acid amide), an unsaturated fatty acid amide (for example, oleic acid amide), a bisfatty acid amide (for example, ethylene bisstearic acid amide), or a low molecular weight polyolefin (for example, a low molecular weight polyethylene or low molecular weight polypropylene having a molecular weight approximately from 500 to 10,000); a heat stabilizer; an antiblocking agent; an antioxidant; a coloring agent; an antistatic agent; an ultraviolet absorbing agent; an antibacterial agent; an insoluble inorganic salt (for example, hydrotalcite); a filler (for example, an inorganic filler); a crystal nucleating agent (for example, talk or kaolin); a surfactant; a wax; a dispersing agent (for example, calcium stearate or stearic acid monoglyceride); a conjugated polyene compound; an aldehyde compound (for example, an unsaturated aldehyde, for example, croton aldehyde).

As the heat stabilizer described above, for the purpose of improving various physical properties, for example, heat stability during melt molding, an additive, for example, an organic acid, for example, acetic acid, propionic acid, butyric acid, lauric acid, stearic acid, oleic acid or behenic acid, or a salt thereof, for example, an alkali metal salt (for example, sodium or potassium), an alkaline earth metal salt (for example, calcium or magnesium) or zinc salt; or an inorganic acid, for example, sulfuric acid, sulfurous acid, carbonic acid, phosphoric acid or boric acid, or a salt thereof, for example, an alkali metal salt (for example, sodium or potassium), an alkaline earth metal salt (for example, calcium or magnesium) or zinc salt may be added. Among them, it is particularly preferred to add acetic acid, a boron compound including boric acid and a salt thereof, an acetate or a phosphate.

The EVOH resin pellet thus-obtained is excellent in melt moldability because it is inhibited from cracking, chipping and generation of fine powder.

As the melt molding method, an extrusion molding method (for example, T-die extrusion, inflation extrusion, blow molding, melt spinning or profile extrusion) or an injection molding method is mainly adopted. The melt molding temperature is often selected from a range from 150 to 300° C. Moreover, the EVOH resin pellet is also frequently used for laminate use, and in particular, it is used as a laminate formed by laminating a thermoplastic resin layer on at least one surface of the layer composed of the EVOH resin.

In the production of the laminate, other base material is laminated on one or both surfaces of the layer of the EVOH resin, and as the lamination method, for example, a method of melt extruding a thermoplastic resin on a film or sheet of the EVOH resin, conversely, a method of melt extruding the EVOH resin on a base material of a thermoplastic resin or the like, a method of co-extruding the EVOH resin and other thermoplastic resin, thither, and a method of dry laminating a film or sheet of the EVOH resin obtained in the invention and a film or sheet of other base material using a known adhesive, for example, an organic titanium compound, an isocyanate compound, a polyester compound or a polyurethane compound are exemplified.

As a partner resin for the co-extrusion, a homo- or copolymer of olefin, for example, straight chain low density polyethylene, low density polyethylene, medium density polyethylene, high density polyethylene, an ethylene-vinyl acetate copolymer, an ionomer, an ethylene-propylene copolymer, an ethylene-acrylic acid ester copolymer, polypropylene, a propylene-α-olefin (α-olefin having from 4 to 20 carbon atoms) copolymer, polybutene or polypentene, a polyolefin-based resin in a broad sense, for example, a modified product obtained by graft-modification of the homo- or copolymer of olefin with an unsaturated carboxylic acid or an ester thereof, polyester, polyamide, copolymerized polyamide, polyvinyl chloride, polyvinylidene chloride, an acrylic resin, polystyrene, PET, a vinyl ester resin, a polyester elastomer, a polyurethane elastomer, chlorinated polyethylene or chlorinated polypropylene is exemplified. The EVOH resin is also able to be co-extruded. Of the resins described above, from the standpoint of ease in the co-extrusion film formation and practicability of the film physical property (particularly, strength), polypropylene, polyamide, polyethylene, an ethylene-vinyl acetate copolymer, polystyrene and PET are preferably used.

Moreover, in the case where a molded product, for example, a film or a sheet is once produced from the EVOH resin pellet obtained by the method of the invention, and thereon other base material is extrusion coated or a film, sheet or the like of other base material is laminated using an adhesive, an optional base material (for example, paper, a metallic foil, a uniaxially or biaxially stretched plastic film or sheet, a woven fabric, a non-woven fabric, a metal fiber felt or a wooden material) can be used other than the thermoplastic resin described above. When a layer of the EVOH resin is designated as x (x1, x2, . . . ) and other base material, for example, a thermoplastic resin layer is designated as y (y1, y2, . . . ), as the layer structure of the laminate, in the form of film, sheet or bottle, not only the two layer structure of x/y but also an optional combination, for example, y/x/y, x/y/x, x1/x2/y, x/y1/y2 or y2/y1/x/y1/y2 is possible, and, in the form of filament, an optional combination, for example, x and y of bimetal type, core (x)-sheath (y) type, core (y)-sheath (x) type or an eccentric core-sheath type is possible.

The laminate can be used as it is in various shapes, and in order to further improve the physical property of the laminate, it is also preferred that the laminate is subjected to a stretching treatment. As to the stretching treatment, any of uniaxial stretching and biaxial stretching may be used, and by performing the stretching at a ratio as high as possible, a stretched film, a stretched sheet or the like of good physical property is obtained without causing pinhole, crack, stretching unevenness, delamination and the like at the time of stretching.

As the method for stretching, in addition to a roll stretching method, a tenter stretching method, a tubular stretching method and a stretching blow method, a method capable of attaining a high stretching ratio among deep drawing molding, vacuum molding and the like can be adopted. In the case of biaxial stretching, any method of a simultaneous biaxial stretching method and a successive biaxial stretching method can be adopted. The stretching temperature is selected in a range approximately from 80 to 170° C., and preferably approximately from 100 to 160° C.

After the completion of the stretching, heat fixation is subsequently performed. The heat fixation can be performed by a well-known means, and the stretched film is subjected to heat treatment at 80 to 170° C., preferably from 100 to 160° C., for approximately from 2 to 600 seconds while maintaining the stretched film in a taut condition. Also, in the case of using for heat shrinking packaging use of raw meat, processed meat, cheese or the like, the stretched film is not subjected to heat fixation after stretching to use as a product film, and after packaging the raw meat, processed meat, cheese or the like with the film, subjected to heat treatment at 50 to 130° C., preferably from 70 to 120° C., for approximately from 2 to 300 seconds to cause heat shrinkage of the film, thereby performing void-free packaging.

The shape of the laminate thus-obtained may be optional, and a film, a sheet, a tape, a bottle, a pipe, a filament and a modified cross-section extrudate or the like are exemplified. The laminate obtained may also be subjected, if desired, to heat treatment, cool treatment, rolling treatment, printing treatment, dry lamination treatment, solution or melt coating treatment, bag making processing, deep drawing processing, box making processing, tube making processing, splitting processing or the like. The film, sheet, container or the like obtained as described above is useful as various packaging materials for food, pharmaceutical, industrial chemical, agricultural chemical and the like.

EXAMPLE

The invention will be described specifically with reference to the examples below, but the invention is not limited to the description of the examples as long as the gist of the invention is not deviated from.

In the examples, unless otherwise specified, "part(s)" is on the weight basis.

Example 1

A water/methanol mixed solution of EVOH resin (ethylene content: 32% by mole, saponification degree: 99.7% by mole, MI: 12 g/10 min (210° C., lead 2,160 g)) (water/methanol mixing ratio=35/65 by weight, EVOH resin concentration: 40%, temperature of the paste: 65° C.) was extruded in a strand form through a cylindrical nozzle at a rate of 1,300 kg/hour into a coagulating bath (water/methanol mixing ratio=97/3 by weight) maintained at 2.0° C., and after contacting with the coagulating bath for 70 seconds by means of a draw-out roller disposed at the end of the coagulating bath, the strand was draw out from the coagulating bath and cut by a cutter to obtain white porous cylindrical pellets having a diameter of 3.7 mm and a length of 4.0 mm.

Then, the pellets were washed with warm water of 35° C. to obtain pellets having the water content of 58%. Further, the pellets obtained were charged in an aqueous solution containing sodium acetate, acetic acid and boric acid to obtain EVOH resin pellets containing 0.017 parts (in terms of metal) of sodium acetate, 0.250 parts of acetic acid and 0.015 parts of boric acid (in terms of boron) with respect to 100 parts of the EVOH resin.

Moreover, the EVOH resin pellets were dried in a batch-wise tower type fluidized-bed dryer by blowing air having temperature of 85° C. at 15,000 Nm³/hour for 0.5 hours to set the water content to 30%. Then, the pellets were dried in a batch-wise ventilation box type drier by blowing nitrogen gas having temperature of 120° C. at 4,000 Nm³/hour for 2 days to obtain dry EVOH resin pellets having the water content of 0.15%. The dimensions of the pellets obtained were 2.5 mm in diameter and 2.5 mm in length and cylindrical.

As to the EVOH resin pellet obtained, an amount of fine powder of EVOH resin pellet after the ball mill crushing test using a tabletop pot mill stand (Model "PM-001") machine produced by AS ONE Corp was measured. Specifically, the EVOH resin pellet (230 g) and alumina balls (15 mmφ, 95 pieces) were charged in an alumina pot (capacity: 1,000 cc, outer diameter: 140 mmφ), treated at 20° C. and a rotation number of 75 rpm for 30 minutes, and an amount crushed was measured.

Comparative Example 1

EVOH resin pellets were produced in the same manner as in Example 1 except for changing the water temperature of the paste (water/methanol mixed solution of EVOH resin) to 68° C. and the temperature of the coagulating liquid to 4.0° C., and evaluated in the same manner as in Example 1.

Example 2

EVOH resin pellets were prepared in the same manner as in Example 1 except for using an ethylene-vinyl acetate copolymer having an ethylene content of 29% by mole in place of the EVOH resin, and evaluated in the same manner as in Example 1

Comparative Example 2

EVOH resin pellets were prepared in the same manner as in Example 2 except for changing the water temperature of the coagulating liquid to 3.0° C., and evaluated in the same manner as in Example 2.

Example 3

EVOH resin pellets were prepared in the same manner as in Example 1 except for using water/methanol=42/58 as the water/methanol mixed solution of EVOH resin, and evaluated in the same manner as in Example 1.

The evaluation results of the examples and comparative examples are shown in Table 1.

TABLE 1

| | Ethylene Content (% by mole) | Temperature of Paste (° C.) | Water Temperature of Coagulating Liquid (° C.) | Amount of Fine Powder (ppm) |
|---|---|---|---|---|
| Example 1 | 32 | 65 | 2.0 | 80 |
| Comparative Example 1 | 32 | 68 | 4.0 | 410 |
| Example 2 | 29 | 65 | 2.0 | 280 |
| Comparative Example 2 | 29 | 65 | 3.0 | 710 |
| Example 3 | 32 | 65 | 2.0 | 32 |

From the results described above, by adjusting the water temperature of the coagulating liquid, the EVOH resin pellets in which an amount of fine powder after the specific ball mill crashing test was small as 400 ppm or less were obtained.

While the invention has been described in detail and with reference to specific embodiments, it is apparent to those skilled in the art that it is possible to add various alterations and modifications insofar as the alterations and modifications do not deviate from the spirit and the scope of the invention. This application is based on Japanese patent application filed on Dec. 24, 2013 (Japanese Patent Application No, 2013-265196) and Japanese patent application filed on Dec. 17, 2014 (Japanese Patent Application No, 2014-255253), and the contents thereof are incorporated herein by reference.

INDUSTRIAL APPLICABILITY

The EVOH resin pellet of the invention can be inhibited from cracking, chipping and generation of fine powder at the time of transport so that it is excellent in the melt moldability, and is industrially extremely useful, because the amount of fine powder after the specific ball mill crushing test is specifically small.

The invention claimed is:

1. A saponified ethylene-vinyl ester copolymer pellet comprising a resin composition containing a saponified ethylene-vinyl ester copolymer resin having an ethylene unit content of from 20 mol % to 35 mol % and in which an amount of fine powder after an impact crushing test with ball mill is 400 ppm or less with respect to the saponified ethylene-vinyl ester copolymer pellet,
wherein the impact crushing test with ball mill comprises:
charging an alumina pot ball mill with a capacity of 1 L and an outer diameter of 140 mm with 230 g of saponified ethylene-vinyl ester copolymer pellets and 95 pieces of 15 mm diameter alumina balls and rotating the charged alumina pot at 75 revolutions per minute for 30 minutes at an initial temperature of 20° C.

2. The saponified ethylene-vinyl ester copolymer pellet according to claim 1, which is obtainable by extruding a solution of the saponified ethylene-vinyl ester copolymer resin into a coagulating liquid of 2.0° C. or less to obtain a coagulated strand and then cutting the coagulated strand to obtain the saponified ethylene-vinyl ester copolymer pellet.

3. The saponified ethylene-vinyl ester copolymer pellet according to claim 1, which is cylindrical and has a diameter of the bottom surface of from 1 to 6 mm and a length of from 1 to 6 mm.

4. The saponified ethylene-vinyl ester copolymer pellet according to claim 2, wherein the solution of a saponified ethylene-vinyl ester copolymer resin is the solution in which a saponified ethylene-vinyl ester copolymer resin is dissolved in a mixed solution having a mixing weight ratio of water/solvent from 80/20 to 5/95.

5. The saponified ethylene-vinyl ester copolymer pellet according to claim 2, wherein a temperature at the time of extrusion of the solution of a saponified ethylene-vinyl ester copolymer resin into a coagulating liquid is from 45 to 70° C.

6. The saponified ethylene-vinyl ester copolymer pellet according to claim 2, wherein the coagulating liquid is a water/alcohol mixed solution.

7. The saponified ethylene-vinyl ester copolymer pellet according to claim 2 which is obtainable by retaining the extruded saponified ethylene-vinyl ester copolymer resin into the coagulating liquid for 50 to 400 seconds.

8. A method for producing a saponified ethylene-vinyl ester copolymer pellet comprising a resin composition containing a saponified ethylene-vinyl ester copolymer resin having an ethylene unit content of from 20 mol % to 35 mol % and in which an amount of fine powder after an impact crushing test with ball mill is 400 ppm or less with respect to the saponified ethylene-vinyl ester copolymer pellet, wherein the impact crushing test with ball mill comprises:

charging an alumina pot ball mill with a capacity of 1 L and an outer diameter of 140 mm with 230 g of saponified ethylene-vinyl ester copolymer pellets and 95 pieces of 15 mm diameter alumina balls and rotating the charged alumina pot at 75 revolutions per minute for 30 minutes at an initial temperature of 20° C.;

wherein the method comprises extruding a solution of the saponified ethylene-vinyl ester copolymer resin into a coagulating liquid having a temperature of 2.0° C. or less to obtain a coagulated strand and then cutting the coagulated strand to obtain the saponified ethylene-vinyl ester copolymer pellet.

9. The method for producing a saponified ethylene-vinyl ester copolymer pellet according to claim 8, wherein a solution in which the saponified ethylene-vinyl ester copolymer resin is dissolved in a mixed solution having a mixing weight ratio of water/solvent from 80/20 to 5/95 is extruded into the coagulating liquid.

10. The method for producing a saponified ethylene-vinyl ester copolymer pellet according to claim 8, wherein a temperature at the time of extrusion of the solution of a saponified ethylene-vinyl ester copolymer resin into a coagulating liquid is from 45 to 70° C.

11. The method for producing a saponified ethylene-vinyl ester copolymer pellet according to claim 8, wherein the coagulating liquid is a water/alcohol mixed solution.

12. The method for producing a saponified ethylene-vinyl ester copolymer pellet according to claim 8, wherein a retention time of the saponified ethylene-vinyl ester copolymer resin in the coagulating liquid is from 50 to 400 seconds.

* * * * *